US008677426B2

(12) United States Patent
Crowe et al.

(10) Patent No.: US 8,677,426 B2
(45) Date of Patent: Mar. 18, 2014

(54) SYSTEM AND METHOD FOR INTERNET PROTOCOL TELEVISION NETWORK STATUS NOTIFICATIONS

(75) Inventors: Keith Crowe, Cedar Park, TX (US); James Pratt, Round Rock, TX (US); Marc Sullivan, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 680 days.

(21) Appl. No.: 12/616,715

(22) Filed: Nov. 11, 2009

(65) Prior Publication Data

US 2011/0113459 A1   May 12, 2011

(51) Int. Cl.
    *H04N 7/18*   (2006.01)
    *G06F 15/173*   (2006.01)

(52) U.S. Cl.
    USPC ............... 725/82; 725/78; 725/80; 725/83; 709/223

(58) Field of Classification Search
    USPC ..................................... 725/78–83
    See application file for complete search history.

(56) References Cited

U.S. PATENT DOCUMENTS

| | | | |
|---|---|---|---|
| 5,835,721 A * | 11/1998 | Donahue et al. | 709/224 |
| 6,316,758 B1 * | 11/2001 | Ubowski et al. | 219/702 |
| 7,158,769 B2 * | 1/2007 | Okanoue et al. | 455/226.1 |
| 7,260,361 B2 * | 8/2007 | Jacobsen | 455/63.1 |
| 7,583,593 B2 * | 9/2009 | Guichard et al. | 370/225 |
| 8,127,335 B2 * | 2/2012 | Hill et al. | 725/109 |
| 2002/0021671 A1 | 2/2002 | Quinlan | |
| 2002/0067739 A1 * | 6/2002 | Wilkes et al. | 370/465 |
| 2004/0066747 A1 * | 4/2004 | Jorgensen et al. | 370/241 |
| 2005/0146598 A1 * | 7/2005 | AbiEzzi et al. | 348/14.01 |
| 2005/0245286 A1 * | 11/2005 | Lin et al. | 455/562.1 |
| 2006/0224763 A1 * | 10/2006 | Altunbasak et al. | 709/231 |
| 2007/0060054 A1 * | 3/2007 | Romesburg | 455/41.2 |
| 2007/0060152 A1 * | 3/2007 | Sakamoto | 455/450 |
| 2007/0067734 A1 * | 3/2007 | Cunningham et al. | 715/779 |
| 2007/0121584 A1 * | 5/2007 | Qiu et al. | 370/352 |
| 2007/0204231 A1 * | 8/2007 | Cunningham et al. | 715/734 |
| 2007/0256096 A1 * | 11/2007 | Wilhelm | 725/34 |
| 2008/0092199 A1 * | 4/2008 | McCarthy et al. | 725/133 |
| 2008/0104454 A1 * | 5/2008 | White | 714/48 |
| 2008/0109839 A1 * | 5/2008 | Bruce et al. | 725/25 |
| 2008/0120639 A1 * | 5/2008 | Walter et al. | 725/33 |
| 2008/0125047 A1 * | 5/2008 | Li et al. | 455/63.1 |
| 2008/0186199 A1 * | 8/2008 | Lynn et al. | 340/825.22 |
| 2008/0220786 A1 * | 9/2008 | Beacham | 455/450 |
| 2008/0268780 A1 | 10/2008 | Werner et al. | |
| 2009/0009640 A1 | 1/2009 | Ishii | |
| 2009/0046625 A1 * | 2/2009 | Diener et al. | 370/319 |
| 2010/0194985 A1 * | 8/2010 | Unger et al. | 348/570 |

* cited by examiner

*Primary Examiner* — An Son P Huynh
(74) *Attorney, Agent, or Firm* — Guntin & Gust, PLC; Ralph Trementozzi

(57) ABSTRACT

A method of running a network status module in a set-top box device is disclosed. A loss of a portion of a signal in an Internet Protocol television network is detected. When interference of the signal is cause over a connection between the set-top box device and the residential gateway, a first icon to indicate a first failure in a connection between the set-top box device and a residential gateway on a display device is displayed. When the interference of the signal is over the wide area network of the Internet Protocol television network, a second icon to indicate a second failure in a wide area network of an Internet Protocol television network is displayed.

15 Claims, 6 Drawing Sheets

SYSTEM AND METHOD FOR INTERNET PROTOCOL TELEVISION NETWORK STATUS NOTIFICATIONS

FIELD OF THE DISCLOSURE

The present disclosure generally relates to communications networks, and more particularly relates to a system and a method for Internet Protocol television network status notifications.

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
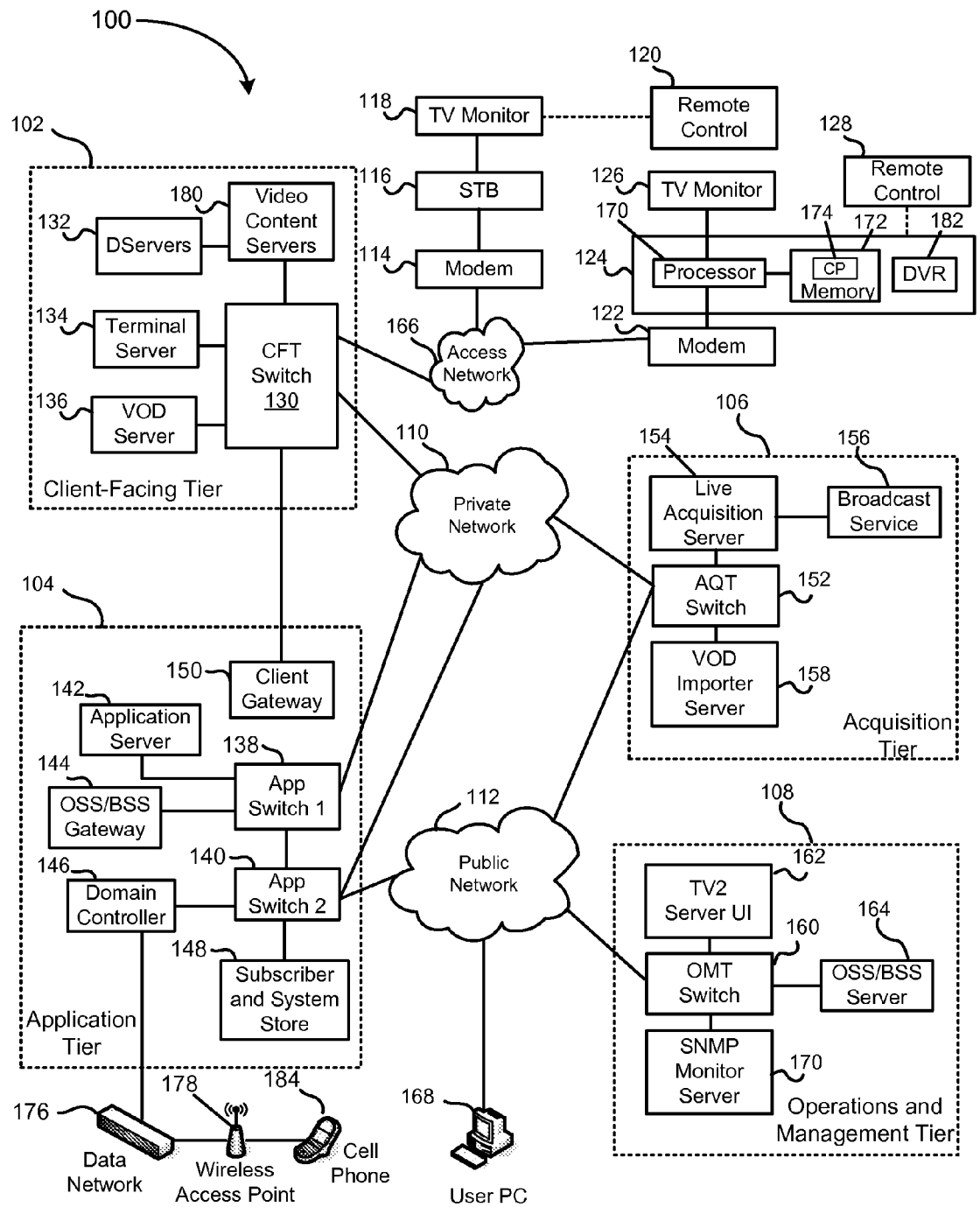
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
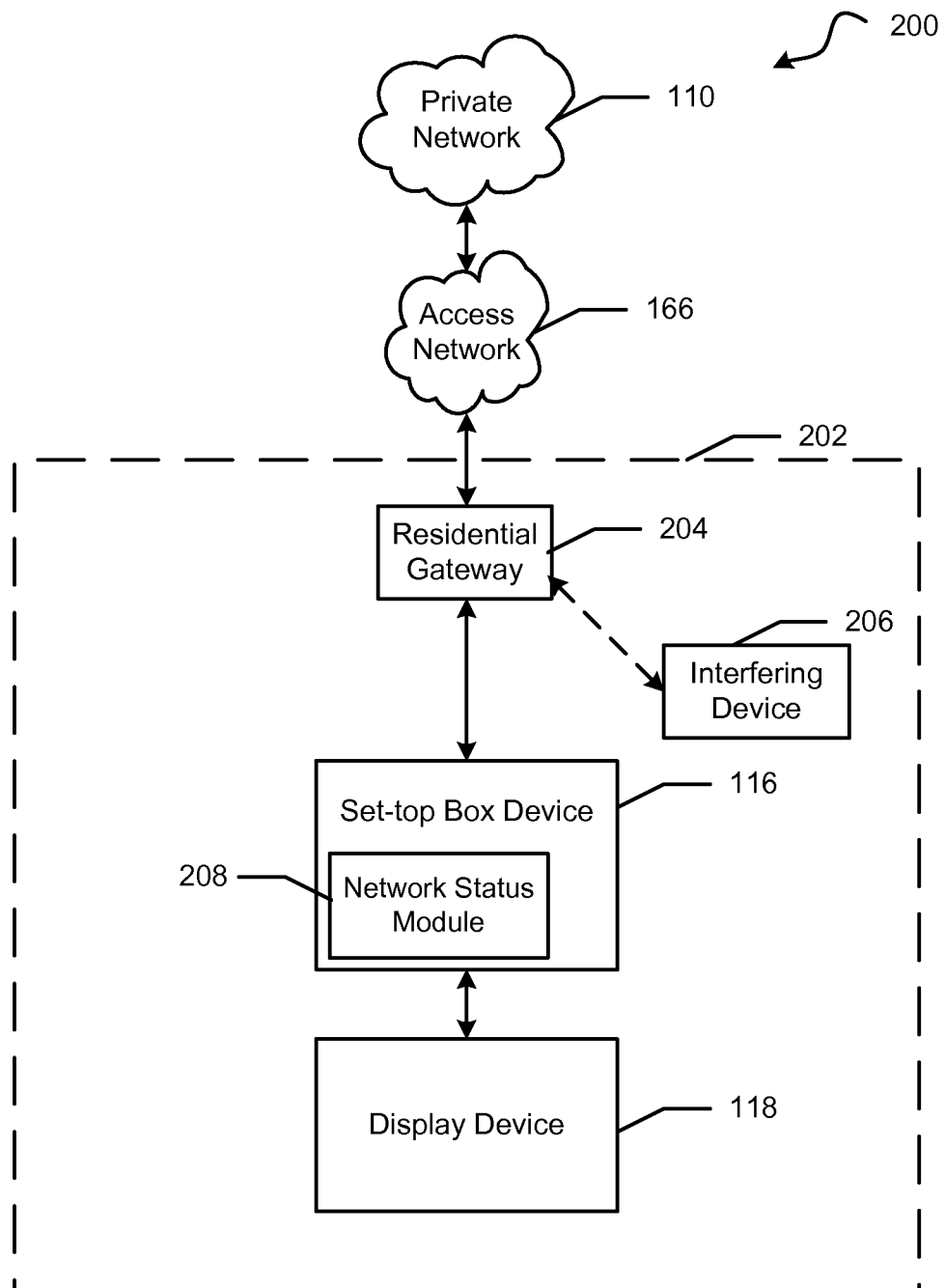
FIG. 2 is a block diagram of an embodiment of an IPTV network.

FIG. 2 shows an embodiment of an IPTV network 200 including the private network 110, the access network 166, and a customer premises 202 having a residential gateway 204, an interfering device 206, the set-top box device 116, and the display device 118. The residential gateway 204 is in communication with the access network 166, the private network 110, and the set-top box device 116. The residential gateway 204 can also be in communication with the interfering device 206. The set-top box device 116 is in communication with the display device 118. The set-top box device 116 can communicate with the residential gateway 204 via a wireless connection or a wired connection. The set-top box device 116 includes a network status module 208, which can communicate with the residential gateway 204 and the display device 118. The network status module 208 can be hardware, software, and/or any combination of hardware and software.

The set-top box device 116 can receive and display IPTV signals from the IPTV network 100 through the private network 110 and the access network 166. However, the user may encounter problems with the ability of the set-top box device 116 to receive and/or display the IPTV signals, or problems with the ability of the residential gateway 204 to receive the IPTV signals from the network. The problem can be a loss of video or audio in an IPTV video stream, loss of an application such as the electronic programming guide, and the like. The problem can arise either in the IPTV network 100, such as in the private network 110 or in the access network 166, or in the connection between the residential gateway 204 and the set-top box device 116.

Figure 3:
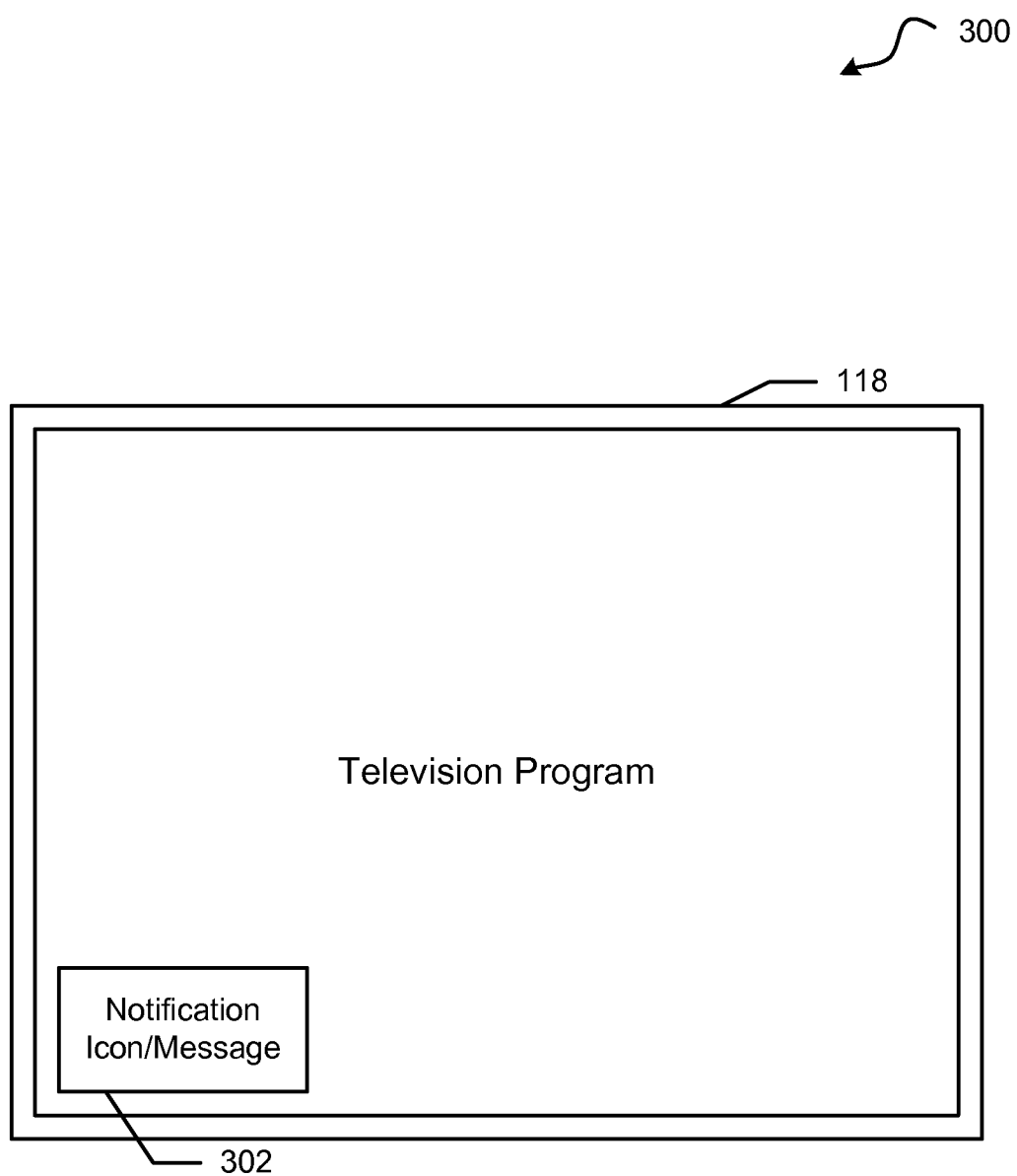
FIG. 3 is an exemplary screen shot of a notification icon/message.

If the problem is caused in the IPTV network 100 outside of the customer premises 202, the residential gateway 204 can determine that either some or the entire IPTV video stream is not being received, and can output a network failure notification to the set-top box device 116. When the network status module 208 receives the network failure notification, the network status notification can output a notification icon/message 302 on the display device 118 as shown in FIG. 3. The notification icon/message 302 can include a visual representation of a video ready access device (VRAD) or other device in the access network 116 or in the private network 110 connected to a residential gateway with a slash through the connection.

The slash through the connection can provide a visual representation of a failure of the residential gateway 204 to connect with the access network 166 and the private network 110. The slash through the connection can also provide a visual representation of a failure of the residential gateway 204 to receive the entire IPTV signal. The notification icon/message 302 may also include a text message, such as 'IPTV network connection lost.' The network status module 208 can continue to display the notification icon/message 302 on the display device 118 until the problem in the IPTV network 100 is resolved and the residential gateway 204 receives the entire IPTV signal without any degradation of the IPTV signal. While the notification icon/message 302 is displayed, a display screen 304 of the display device 118 may be blank, may have video without audio, may have audio without video, may have pixelization of the video, and the like.

Alternatively, the IPTV network 100 connection from the private network 110, through the access network 166, to the residential gateway 204 may be working properly but the connection between the residential gateway and the set-top box device 116 may have failed or may be receiving interference from the interfering device 206. If the set-top box device 116 and the network status module 208 do not receive the IPTV signal and/or the network failure notification from the residential gateway 204, the network status module can determine that the connection between the residential gateway and the set-top box device has failed. The network status module 208 can then display the notification icon/message 302 on the display device 118. The notification icon/message 302 can be associated with the connection between the residential gateway 204 and the set-top box device 116. In this situation, the notification icon/message 302 may be a visual representation of the connection between the residential gateway 204 and the set-top box device 116 with a slash through it to indicate that the connection has been lost.

The interfering device 206 may be a cordless telephone, a microwave oven, or any other device that can cause interference with an IPTV signal from the residential gateway 204 to the set-top box device 116. The interfering device 206 may produce signals in the frequency range utilized by the IPTV signal sent from the residential gateway 204 to the set-top box device 116. The signals from the interfering device 206 can cause distortion to or total loss of the video stream received by the set-top box device 116.

For example, the user may be watching a television program on the display screen 304 of the display device 118, and the video may become blocky or the audio may begin to cut out. The network status module 208 can then display the notification icon/message 302 to indicate that the interfering device 206 is interfering with the reception of the IPTV signal by the set-top box device 116. In this situation, the notification icon/message 302 may be the visual representation of the connection between the residential gateway 204 and the set-top box device 116 with a slash through it to indicate that the IPTV signal is experiencing interference within the customer premises 202.

When the notification icon/message 302 is displayed with an icon or message indicating that the IPTV signal between the residential gateway 204 and the set-top box device 116 is experiencing interference, the user can determine whether the interfering device 206 is near the residential gateway or the set-top box device. If the user moves the interfering device 206 away from the residential gateway 204 and the set-top box device 116, the network status module 208 can determine that the set-top box device is receiving the IPTV signal without any interference. The network status module 208 can then stop displaying the notification icon/message 302 on the display device 118.

Figure 4:
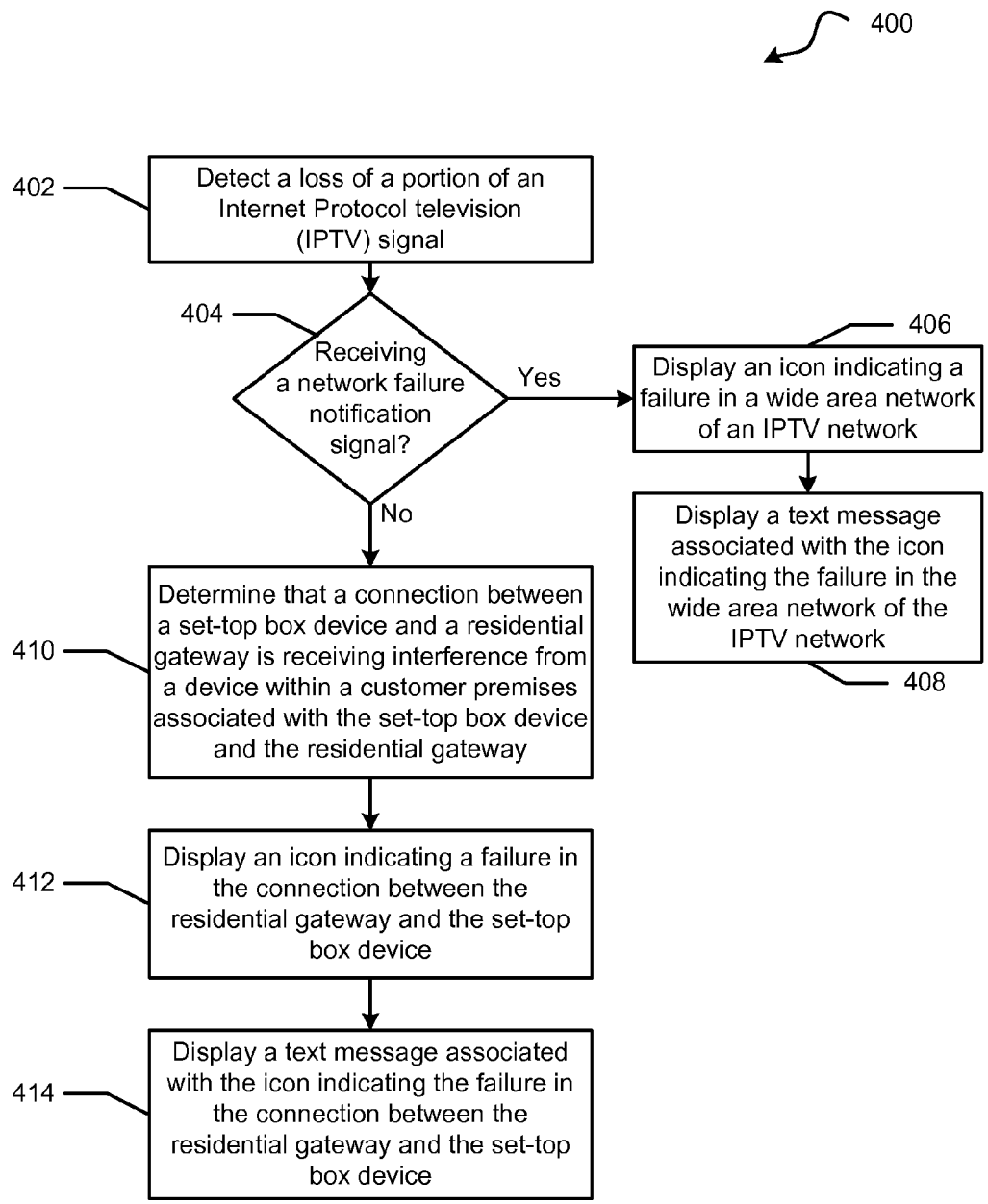
FIG. 4 is a flow diagram of a method for displaying a notification icon/message for an IPTV network failure.

FIG. 4 shows a flow diagram of a method 400 for displaying a notification icon/message for an IPTV network failure. At block 402, a loss of a portion of an IPTV signal is detected. The loss of the portion of the IPTV signal can be a loss of an audio portion of the IPTV signal, a loss of a video portion of the IPTV signal, a loss of the entire IPTV signal, and the like. A determination is made whether a network failure notification signal is received at block 404. If the network failure notification signal is received, an icon indicating a failure of the IPTV network outside of a customer premises is displayed at block 406. At block 408, a text message associated with the icon indicating the failure of the IPTV network outside of the customer premises is displayed.

If the network failure notification signal is not received, a connection between a set-top box device and a residential gateway is determined to be receiving interference from a device within the customer premises associated with the set-top box device and the residential gateway at block 410. The device can be a cordless telephone, a microwave oven, and the like. The connection can be a wireless connection or a wired connection. At block 412, an icon indicating a failure in the connection between the residential gateway and the set-top box device is displayed. A text message associated with the icon indicating a failure in the connection between the residential gateway and the set-top box device is displayed at block 414.

Figure 5:
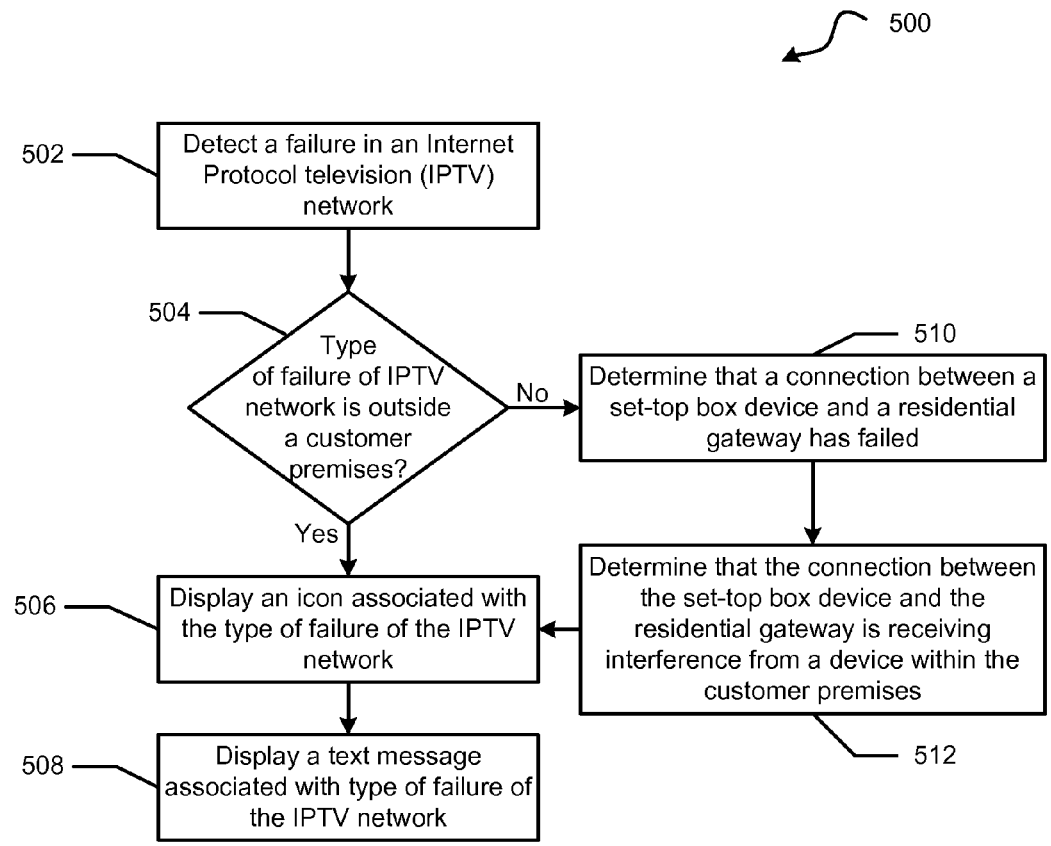
FIG. 5 is a flow diagram of alternative method for displaying a notification icon/message for the IPTV network failure.

FIG. 5 shows a flow diagram of alternative method 500 for displaying a notification icon/message for an IPTV network failure. At block 502, a failure in the IPTV network is detected. A determination is made whether a type of failure of the IPTV network is outside a customer premises at block 504. If the type of failure of the IPTV network is outside the customer premises, an icon associated with the type of failure of the IPTV network is displayed at block 506. At block 508, a text message associated with the type of failure of the IPTV network is displayed.

If the type of failure of the IPTV network is not outside the customer premises, a determination is made that a connection between a set-top box device and a residential gateway in the customer premises has failed at block 510. The connection between the set-top box device and the residential gateway can be a wireless connection or a wired connection. At block 512, a determination is made that the connection between the set-top box device and the residential gateway is receiving interference from a device within the customer premises and the flow diagram continues as stated above at block 506. The device can be a cordless telephone, a microwave oven, and the like.

Figure 6:
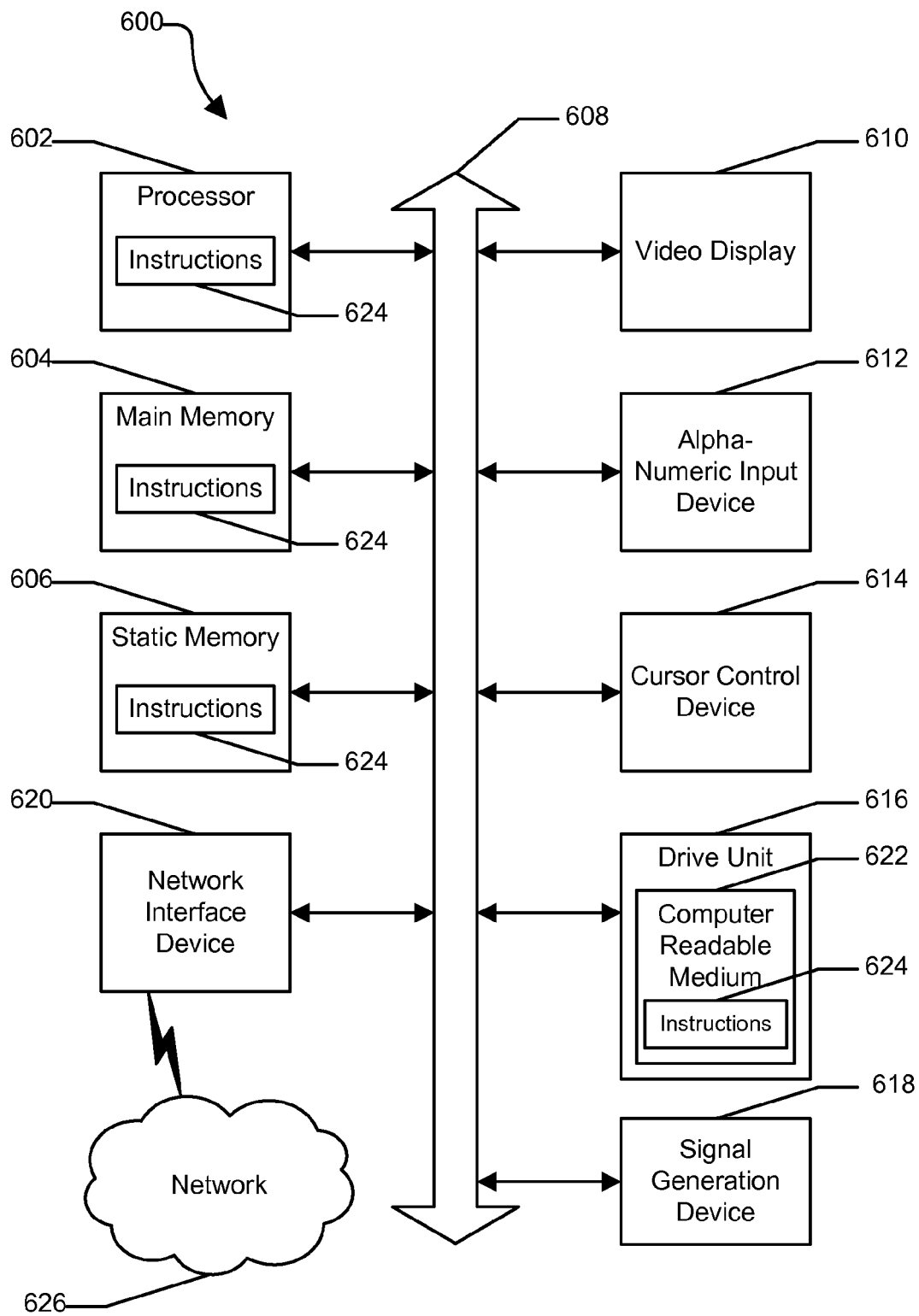
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid state display, or a cathode ray tube (CRT). Additionally, the computer system 600 may include an input device 612 such as a keyboard, and a cursor control device 614 such as a mouse. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set-top box device comprising:
a memory for storing computer instructions; and
a processor coupled to the memory, wherein in response to executing the computer instructions, the processor performs operations, comprising:
facilitating communications with a residential gateway located within a customer premises;
detecting at the set-top box device a loss of at least part of an Internet protocol television signal from the residential gateway in response to a network failure;
determining whether the set-top box device has received a network failure notification signal from the residential gateway;
presenting on a display device located within the customer premises, a first text message associated with a first icon indicating a first network failure of a connection between the set-top box device and the residential gateway in response to determining that the network failure notification signal has not been received from the residential gateway by the set-top box device, wherein the first network failure is indicative of an interfering device located within the customer premises, wherein the first text message associated with the first icon further indicates that the interfering device has interfered with receiving of the Internet protocol television signal by the set-top box device; and
presenting on the display device a second message associated with a second icon, indicating a second network failure of a wide area network of an Internet protocol television network in response to determining that the network failure notification signal has been received from the residential gateway.

2. The set-top box device of claim 1 wherein executing the computer instructions causes the processor to perform operations comprising determining that the connection between the set-top box device and the residential gateway is subject to interference from the interfering device within the customer premises.

3. The set-top box device of claim 2 wherein the connection between the set-top box device and the residential gateway is selected from a group consisting of a wireless connection and a wired connection.

4. The set-top box device of claim 2 wherein the interfering device is selected from a group consisting of a cordless telephone and a microwave oven.

5. A method, comprising:
detecting, by a set-top box device including a processor, located within a customer premises, a loss of a portion of an Internet protocol television signal in an Internet protocol television network in response to a network failure;
determining whether the set-top box device has received a network failure notification signal from a residential gateway located within the customer premises;
displaying, by the set-top box device, on a display device located within the customer premises, a first text message associated with a first icon to indicate a first network failure in a connection between the set-top box device and the residential gateway in response to determining that the network failure notification signal has not been received from the residential gateway by the set-top box device, wherein the first network failure is indicative of an interfering device located within the customer premises, wherein the first text message associated with the first icon further indicates that the interfering device has interfered with receiving of the Internet protocol television signal by the set-top box device; and
displaying, by the set-top box device, on the display device a second message associated with a second icon to indicate a second network failure in a wide area network of the Internet protocol television network, when the loss of the portion of the Internet protocol television signal is over the wide area network of the Internet protocol television network in response determining that the network failure notification signal has been received from the residential gateway by the set-top box device.

6. The method of claim 5 further comprising:
determining, by the set-top box device, that the connection between the set-top box device and the residential gateway is receiving interference from the interfering device within the customer premises.

7. The method of claim 6 wherein the connection between the set-top box device and the residential gateway is selected from a group consisting of a wireless connection and a wired connection.

8. The method of claim 6 wherein the interfering device is selected from a group consisting of a cordless telephone and a microwave oven.

9. The method of claim 5 wherein the loss of the portion of the Internet protocol television signal is of an audio portion of the Internet protocol television signal, of a video portion of the Internet protocol television signal, of an entire portion of the Internet protocol television signal, or any combination thereof.

10. A method, comprising:
facilitating, by an Internet protocol television system operating within an Internet protocol television network, communications with a residential gateway located within a customer premises;
detecting, by the Internet protocol television system having a processor located within the customer premises, a network failure in the Internet protocol television network in response to detecting a loss of a portion of an Internet protocol television signal from the residential gateway;

determining, by the Internet protocol television system, a type of the network failure responsive to the detecting of the network failure;

determining, by the Internet protocol television system, by way of a network failure notification signal that a connection between a set-top box device and the residential gateway has failed;

detecting, by the Internet protocol television system, responsive to the type of the network failure, that network failure of the connection between the set-top box device and the residential gateway is subject to interference from an interfering device within a customer premises associated with the set-top box device;

displaying, by the Internet protocol television system, on a display device located within the customer premises, a first text message associated with a first icon indicating a first network failure of the connection between the set-top box device and the residential gateway in response to determining that the network failure notification signal has not been received from the residential gateway by a set-top box device, wherein the first text message associated with the first icon further indicates that the interfering device has interfered with the receiving of the Internet protocol television signal; and presenting on the display device, by the Internet protocol television system, a second message associated with a second icon, indicating a second network failure of a wide area network of the Internet protocol television network, in response to determining that the network failure notification signal has been received from the residential gateway.

11. The method of claim 10 wherein the connection between the set-top box device and the residential gateway is selected from a group consisting of a wireless connection and a wired connection.

12. The method of claim 10 wherein the interfering device is selected from a group consisting of a cordless telephone and a microwave oven.

13. The method of claim 10 further comprising:
determining, by the Internet protocol television system, that the second network failure is in the Internet protocol network outside of the customer premises associated with the set-top box device.

14. The method of claim 10 wherein the network failure causes loss of an audio portion of an Internet protocol television signal, loss of a video portion of the Internet protocol television signal, loss of an entire portion of the Internet protocol television signal, or any combination thereof.

15. The method of claim 10, wherein the Internet protocol television system is the set-top box device.

* * * * *